(12) United States Patent
Maloo

(10) Patent No.: US 10,355,964 B2
(45) Date of Patent: Jul. 16, 2019

(54) METHOD AND SYSTEM TO CAPTURE SELECTED NETWORK DATA

(71) Applicant: AT&T Intellectual Property I, LP, Atlanta, GA (US)

(72) Inventor: Sunil Maloo, Edison, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 378 days.

(21) Appl. No.: 14/529,700

(22) Filed: Oct. 31, 2014

(65) Prior Publication Data
US 2016/0127218 A1 May 5, 2016

(51) Int. Cl.
*H04L 12/26* (2006.01)

(52) U.S. Cl.
CPC ............ *H04L 43/12* (2013.01); *H04L 43/028* (2013.01)

(58) Field of Classification Search
CPC .............................. H04L 43/12; H04L 43/028
See application file for complete search history.

(56) References Cited

U.S. PATENT DOCUMENTS

| | | | |
|---|---|---|---|
| 5,515,376 A * | 5/1996 | Murthy | H04L 12/46 370/402 |
| 6,185,615 B1 * | 2/2001 | Labiaga | H04L 29/06 709/224 |
| 6,449,739 B1 | 9/2002 | Landan | |
| 6,801,940 B1 | 10/2004 | Moran et al. | |
| 6,871,227 B2 | 3/2005 | Allen | |
| 7,149,189 B2 | 12/2006 | Huntington et al. | |
| 7,248,868 B2 | 7/2007 | Snyder et al. | |
| 7,352,706 B2 | 4/2008 | Klotz et al. | |
| 7,369,509 B2 | 5/2008 | Lapeyre et al. | |
| 7,525,910 B2 | 4/2009 | Wen | |
| 7,813,277 B2 | 10/2010 | Okholm et al. | |
| 7,912,999 B2 | 3/2011 | Boesel et al. | |
| 7,962,606 B2 | 6/2011 | Barron et al. | |
| 8,140,665 B2 | 3/2012 | Malloy et al. | |
| 8,289,960 B2 | 10/2012 | Raja et al. | |
| 8,370,483 B2 | 2/2013 | Choong et al. | |
| 8,554,892 B2 | 10/2013 | Raja et al. | |
| 8,601,122 B2 | 12/2013 | Malloy et al. | |

(Continued)

OTHER PUBLICATIONS

Stemm, Mark, et al., "A network measurement architecture for adaptive applications", INFOCOM 2000. Nineteenth Annual Joint Conference of the IEEE Computer and Communications Societies Proceedings, IEEE, vol. 1 (2000).

(Continued)

*Primary Examiner* — Charles C Jiang
*Assistant Examiner* — Ryan C Kavleski
(74) *Attorney, Agent, or Firm* — Baker Botts, LLP

(57) ABSTRACT

A method of capturing selected network data includes selecting a first server from a plurality of servers in accordance with a first criterion, and the first server processing a first packet of a plurality of packets; selecting a second packet from the plurality of packets in accordance with a second criterion, and providing data associated with the second packet to a capture server. The first and second criteria are based on second information associated with the second packet. The second information is associated with one of the session layer, presentation layer, and application layer. A corresponding system and computer-readable device are also disclosed.

20 Claims, 4 Drawing Sheets

(56) References Cited

U.S. PATENT DOCUMENTS

| | | | |
|---|---|---|---|
| 8,694,779 B2 | 4/2014 | Gagnon et al. | |
| 8,717,901 B2 | 5/2014 | Breslin et al. | |
| 2001/0055274 A1* | 12/2001 | Hegge | H04L 12/2602 370/229 |
| 2002/0194342 A1* | 12/2002 | Lu | H04L 29/06 709/227 |
| 2005/0254490 A1* | 11/2005 | Gallatin | H04L 12/4645 370/389 |
| 2010/0211675 A1 | 8/2010 | Ainali et al. | |
| 2010/0325263 A1* | 12/2010 | Raja | H04L 49/90 709/224 |
| 2011/0145431 A1 | 6/2011 | Momchilov et al. | |
| 2011/0213869 A1 | 9/2011 | Korsunsky et al. | |
| 2012/0096106 A1* | 4/2012 | Blumofe | G06Q 50/00 709/213 |
| 2013/0054737 A1 | 2/2013 | Miranda et al. | |
| 2013/0054817 A1 | 2/2013 | Moen et al. | |
| 2013/0262655 A1 | 10/2013 | Desch nes et al. | |
| 2015/0120916 A1* | 4/2015 | Frattura | H04L 67/1095 709/224 |
| 2017/0331930 A1* | 11/2017 | Shcherbakov | H04L 67/10 |
| 2018/0077071 A1* | 3/2018 | Raney | H04L 41/0893 |

OTHER PUBLICATIONS

Kim, Young Yong, et al., "Capturing important statistics of a fading/shadowing channel for network performance analysis", Journal on Selected Areas in Communications, IEEE, vol. 17, No. 5 (May 1999) pp. 888-901.

Cohen, Rami, et al., "An intent-based approach for network virtualization", Integrated Network Management, IFIP/IEEE International Symposium, IEEE (2013).

Singh, Gurdev, et al., "Availability metrics for cloud vibrant behaviour with benchmarks influence on diverse facets", International Journal of Software Engineering & Applications (IJSEA), vol. 3, No. 1 (Jan. 2012).

Lu, Yi, et al., "Join-Idle-Queue: A novel load balancing algorithm for dynamically scalable web services", Journal Performance Evaluation, vol. 88, Issue 11 (2011) 1056-1071.

\* cited by examiner

METHOD AND SYSTEM TO CAPTURE SELECTED NETWORK DATA

BACKGROUND

Technical Field

Embodiments disclosed herein relate to capturing network data. In particular, embodiments disclosed herein relate to selecting data to be captured using an application delivery controller.

Brief Description of Related Art

Network data can be captured for a variety of purposes, such as security, operations analysis, data collection and quality of service assurance. Data is captured by providing network using an active or passive device, such as a tap, probe, or filter or copper splitter, that provides a copy of all network traffic to one or more capture servers, or switch port analyzer (SPAN) ports that provide a copy of network traffic, with limited filtering capabilities, to one or more capture servers. Filtering by SPAN ports is limited, because filtering can only be performed on data that corresponds to lower levels of a network model. Such lower levels include, for example, layers 1-3 and parts of layer 4 of the open systems interconnection (OSI) model, or layers 1 and 2 and parts of layer 3 of the transfer control protocol/internet protocol (TCP/IP) model. The limited ability to filter which data is to be captured from the network traffic and sent to the capture servers requires a large number of capture servers to store and process a large quantity of captured network data.

SUMMARY

Embodiments of the disclosure will become apparent from the following detailed description considered in conjunction with the accompanying drawings. It is to be understood, however, that the drawings are designed as an illustration only and not as a definition of the limits of this disclosure.

The disclosure is directed to a system to capture selected network data. The system includes a load balance analyzer and a data capture analyzer. The load balance analyzer selects a first server from a plurality of servers in accordance with a first criterion. The first server processes a first packet of a plurality of packets. The data capture analyzer selects a second packet from the plurality of packets in accordance with a second criterion. The data capture analyzer further provides data associated with the second packet to a capture server. The first criterion is based on first information associated with the first packet, and the first information is associated with one of a session layer, presentation layer, and application layer. The second criterion is based on second information associated with the second packet, and the second information is associated with one of the session layer, presentation layer, and application layer.

In an embodiment of the system, the load balance analyzer selects a second server from the plurality of servers in accordance with the first criterion, and the second server processes the second packet.

In an embodiment of the system, the first server processes the first packet in accordance with a first application, and the first application is associated with the first packet. The second server processes the second packet in accordance with a second application, and the second application is associated with the second packet.

In an embodiment, the system further includes a data capture copier and a data capture transmitter. The data capture copier generates a copy of the second packet. The data capture transmitter transmits the copy of the second packet to the capture server.

In an embodiment of the system, the session layer, presentation layer, and application layer are associated with one of an open systems interconnection model and a transfer control protocol/internet protocol model.

In an embodiment of the system, the load balance analyzer selects the second server and the data capture analyzer selects the second packet while the second packet is accessed by a single access operation.

In an embodiment of the system, the second information is included in an application header associated with the second packet.

In an embodiment of the system, the second information is included in an application payload associated with the second packet.

The disclosure is further directed to a method to capture selected network data. The method includes selecting a first server from a plurality of servers in accordance with a first criterion. The first server processes a first packet of a plurality of packets. The method further includes selecting a second packet from the plurality of packets in accordance with a second criterion, and providing data associated with the second packet to a capture server. The first criterion is based on first information associated with the first packet, and the first information is associated with one of a session layer, presentation layer, and application layer. The second criterion is based on second information associated with the second packet, and the second information is associated with one of the session layer, presentation layer, and application layer.

The method may further include selecting a second server from the plurality of servers in accordance with the first criterion, the second server processing the second packet.

In an embodiment of the method, the first server processes the first packet in accordance with a first application, and the first application is associated with the first packet. Additionally, the second server processes the second packet in accordance with a second application, and the second application is associated with the second packet.

The method may further include generating a copy of the second packet, and transmitting the copy of the second packet to the capture server.

In an embodiment of the method, the session layer, presentation layer, and application layer are associated with one of an open systems interconnection model and a transfer control protocol/internet protocol model.

In an embodiment, the method may further include accessing the second packet by a single access operation during which the second server is selected and the second packet is selected.

In an embodiment of the method, the second information is included in one of an application header and an application payload associated with the second packet.

The disclosure is yet further directed to a computer-readable storage medium storing instructions that, when executed by a device, cause the device to perform operations. The operations include selecting a first server from a plurality of servers in accordance with a first criterion. The first server processes a first packet of a plurality of packets. The operations further include selecting a second packet from the plurality of packets in accordance with a second criterion, and providing data associated with the second packet to a capture server. The first criterion is based on first information associated with the first packet, and the first information is associated with one of a session layer, presentation layer, and application layer. The second criterion is based on second information associated with the second packet, and the second information is associated with one of the session layer, presentation layer, and application layer.

The operations may further include selecting a second server from the plurality of servers in accordance with the first criterion, and the second server processing the second packet.

In an embodiment, the first server may process the first packet in accordance with a first application, and the first application is associated with the first packet. The second server processes the second packet in accordance with a second application, and the second application is associated with the second packet.

The operations may further include generating a copy of the second packet, and transmitting the copy of the second packet to the capture server.

In an embodiment, the second server is selected and the second packet is selected while the second packet is accessed by a single access operation.

Additional embodiments will become apparent from the following detailed description, which is to be read in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

The limited ability to filter which data is to be captured from the network traffic and sent to the capture servers requires a large number of capture servers to store and process a large quantity of captured network data. Accordingly, there exists a need for a system and method to filter network traffic to be captured based on information in at least one of the session, presentation, and application layers.

The embodiments described herein are directed to methods and systems of capturing data. An application delivery controller (ADC) receives packets and performs load balancing by determining which real server in the network to which the packet is to be sent, and then transmits the packet to the determined real server. An ADC, as defined herein, is a device that performs services that aid, support, or optimizes the real servers and their functions. These functions include, for example, load balancing, application acceleration, rate shaping, secure sockets layer (SSL) offloading, and providing a web application firewall. A packet is a formatted unit of data carried by a packet-switched network. A real server, as defined herein, is a processing device, such as an application server, implemented using hardware and software that processes packets received from a client device. The real server uses an application indicated by the packet to process the packet.

In one or more disclosed embodiments, expansion of the structure and function of conventional ADCs is provided, in which the ADC performs functions associated with data capture, including examining the packet and determining whether or not an incoming packet should be retained for data capture. If the determination is to retain the incoming packet, then the ADC copies the packet and transmits the copy of the packet to a capture server. The copied packet is captured data. A capture server, as defined herein, is a processing device implemented using hardware and software that receives copies of packets, such as to archive the packets, sample the packets, or analyze the packets. The capture server can submit the packets to an associated processing device to store or process the packets.

Figure 1:
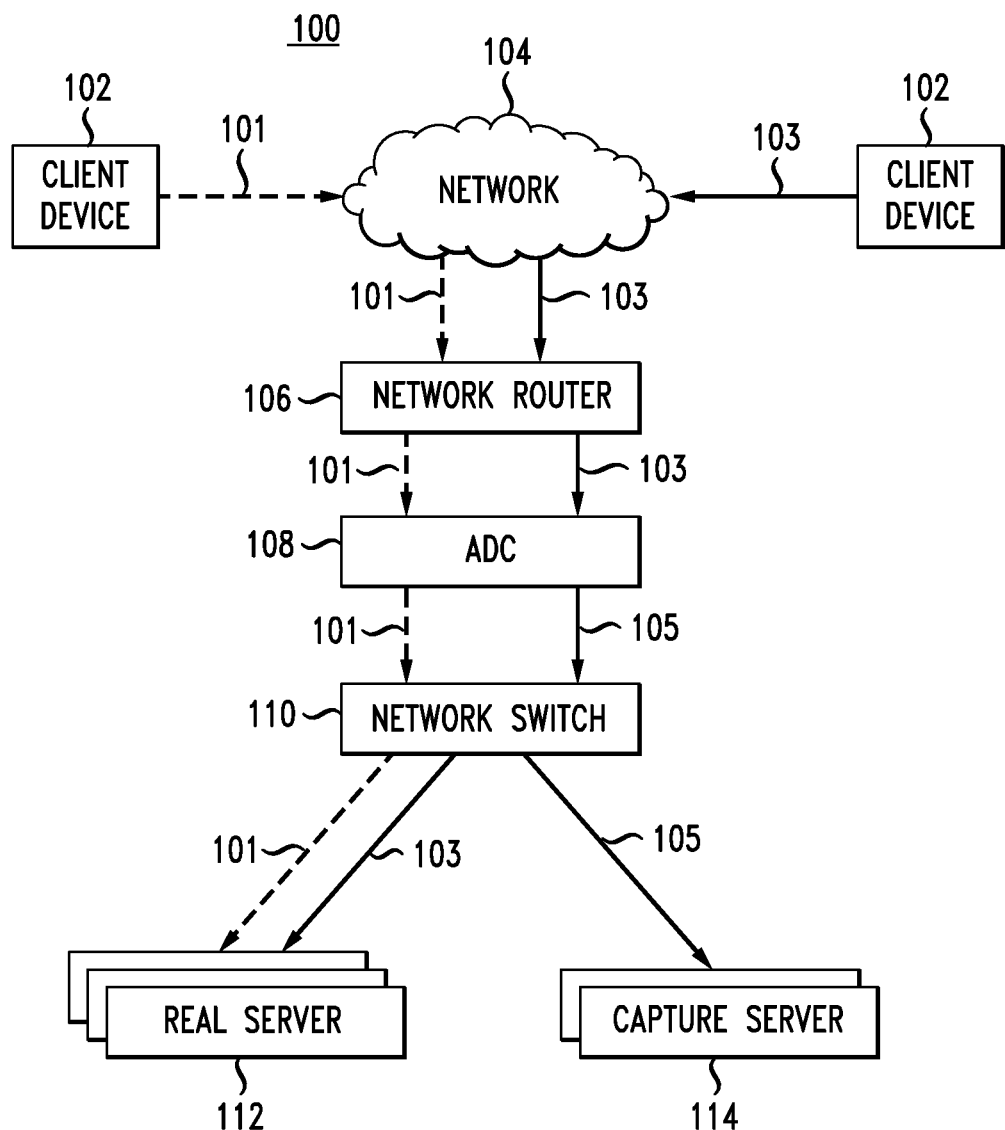
FIG. 1 shows a data capture system in accordance with the disclosure herein.

FIG. 1 shows a data capturing system 100. Data capturing system 100 includes a plurality of client devices 102, a network 104, network router 106, an ADC 108, a network switch 110, at least one real server 112 and at least one capture server 114. The client devices 102, network router 106, ADC 108, network switch 110, real servers 112, and capture servers 114 can be physical devices or software programs that are executed by physical devices. The client devices 102, network router 106, ADC 108, network switch 110, real servers 112, and capture servers 114 can be virtual devices that share a physical device with other virtual devices to perform their respective functions or exchange and process data using cloud computing. Each of the physical devices associated with the client devices 102, network router 106, ADC 108, network switch 110, real servers 112, and capture servers 114 include physical computer resources, such as at least one memory device, storage device, central processing unit, and communication interface for communicating with other devices (e.g., via a network).

The client devices 102 are implemented using hardware and/or software and transmit one or more packets that the client device 102 that is associated with an application. The packets can be associated with a variety of applications. A request can include multiple packets adhering to protocols of a specific application. The packets can include a request or data to be processed by the application. The application is executed by a real server 112. Examples of requests include requesting a webpage, a search request, sending an email, performing an online transaction, accessing data stored on a cloud-based storage system, accessing a bank account, and providing real-time directions to a mobile device that provides its position in space using a global positioning service (GPS) device. In the example shown, a first client device 102 transmits a first packet 101, and a second client device 102 transmits a second packet 103.

The network router 106 connects a first network to a second network. Network router 106 receives the first packet 101 and the second packet 103 via a first network 104, and transmits the first and second packets 101, 103 to ADC 108 via a second network.

The first network 104 can include one or more of a wide area network (WAN), local area network (LAN), virtual private network (VPN), peer-to-peer (P2P) network, cellular network for mobile devices, as well as any other public or private network (e.g., the Internet), or any combination thereof. Other existing or yet-to-be-developed communications networks can form at least a part of the communication network 104. At least a portion of the transmission over the communication network 104 can be accomplished, for example, via TCP/IP, user datagram protocol (UDP)/IP, or any combination of protocols.

The second network provides an interface between the ADC 108 and the real servers 112, and between the ADC 108 and the capture servers 114. The second network can include one or more of a WAN, LAN, VPN, as well as any other public or private network (e.g., the Internet), or any combination thereof. Other conventional or yet-to-be developed communications networks can form at least a part of the communication network 104. At least a portion of the transmission over the communication network 104 can be accomplished, for example, via TCP/IP, UDP/IP, or any combination of conventional protocols or yet-to-be developed protocols. In the embodiment shown, the ADC 108 transmits the packets to the real servers 112 and the capture servers 114 via the network switch 110.

The network switch 110 provides a connection between the ADC 108 and the real servers 112, and between the ADC 108 and the capture servers 114. For example, the network switch 110 can use packet switching to forward data from the ADC 108 to the real servers 112 or the capture servers 114.

The ADC 108 can be a load balancer, a server load balancer, a global server load balancer or a similar device that manages packets from a client device 102 and distributes the respective packets to selected real servers 112 based on a load balancing criterion (a first criterion). The first criterion is based on first information associated with a packet. The first information is included in an application header or application payload of the packet. The ADC 108 manages a flow of data from a client device 102 to one or more applications executed by the real servers 112. The applications can be, for example, enterprise applications, web applications, web services, and mobile applications (e.g., apps), gaming applications, email applications, security applications, etc. Load balancing functions performed by the ADC 108 can include optimizing end-user performance, reliability, resource use, security, authentication, authorization, and accounting, compression, and reverse caching. The ADC 108 transmits each packet to a real server 112 that has been selected as a destination for the packet.

The ADC 108, in addition to supporting the real servers by performing load balancing, further processes the packets using a policy to determine which packets should be transmitted to the capture servers 114 based on at least one criterion set by the policy (a second criterion). The second criterion is based on second information associated with a packet. The second information is included in an application header or application payload of the packet. If the second information associated with the packet satisfies the policy's criteria, the packet is sent to a capture server 114. The policy can include determining which packets to capture, and to which capture server 114 the packet should be sent. The policy can use information from layer 1 to 7 of the OSI model and user configured input. The determination of a capture server 114 can be based on type of application, load on the capture server, round-robin of connections, etc. The ADC 108 copies the packet to generate a mirror copy 105. The ADC 108 transmits the mirror copy 105 to the capture server 114.

If the packet does not satisfy the policy's criteria, then the packet is transmitted to the real server 112 that has been selected as a destination for the packet. However, the packet is not transmitted to a capture server 114 under these circumstances.

A conventional ADC performs operations that help, enhance, or otherwise service the operations of real servers and the applications associated with the real servers for processing packets of the network traffic. ADC 108 performs additional tasks, including the selection of packets for data capture based on the second criterion, copying the selected packets, and transmitting the selected packets to capture servers 114. It is unconventional to assign such additional tasks on an ADC. A burden associated with the additional tasks is significantly reduced by streamlining the process to avoid performing a same operation twice. One example of streamlining the process includes accessing a packet by a single access operation during which the load balance analyzer 202 selects the real server 112 to process the accessed packet in accordance with the first criterion, and the data capture analyzer 206 determines whether or not to select the packet in accordance with the second criterion. An access operation, as referred to herein, includes reading data included in the packet having access to the data read, such as to perform an operation (e.g., copy, compare, perform a calculation or logic operation) on the data that is read.

Additionally, the policy applied by the data capture analyzer 206 can access application header and payload data to select packets to be copied and transmitted to a selected capture server 114. In traditional data capture configurations selection of packets for data capture was limited by the capabilities of the devices, such as taps, probes, or fiber or copper splitters, which cannot access the application header or payload data. The ability to use a policy that can include multiple conditions which use application header or payload data amount to select packets allows for an improved ability to select packets, which can reduce the number of packets that are selected, copied, and transmitted to the capture servers 114. Additionally, since the amount of captured packets is reduced, the amount of capture servers 114 can be reduced.

The real servers 112 process the packets, including using an application to perform an action in response to the packet or a request included in the packet. Examples of processing the request include providing a requested webpage, providing search results in response to a search request, sending an email in accordance with the request, performing a requested online transaction, providing access to requested data stored on a cloud-based storage system, providing requested access to a bank account, and providing requested real-time directions to a mobile device that provides its position in space using a global positioning service (GPS) device.

The capture servers 114 store the mirror copies 105 of the packets, for example, to archive the packets, sample the packets, or perform analysis on the packets. The capture servers 114 can store the mirror copies 105 of the packets on storage devices associated with capture servers 114. Once the packet has been processed on the capture server 114, the packet can be discarded.

The policy can include one or more rules that based on information that corresponds to higher layers in network models including the session layer, the presentation layer and the application layer, such as information available in OSI layers 5-7 (e.g., session, presentation, and application layers) and/or portions of OSI layer 4 (e.g., transport layer), or TCP/UDP layer 4 (e.g., application layer) and/or portions of IP layer 3 (e.g., end-to-end transport layer). The policy can include rules that access data in at least one of the session, presentation, and application layers that is not accessible to a conventional SPAN port on a network router or switch for determining which packets will be copied and transmitted to the capture servers 114. A filter implanting the policy can include deep packet inspection, such as signature based deep packet inspection. The filter can be constructed to inspect an IP header field, TCP/UDP header field, application header field, and application data and determine if a predetermined data key matches any one or more of these fields. The policies using these filters can be simple or complex. A simple policy can match data in a single field to predetermined data; a complex policy can match data in multiple fields to predetermined data, and/or can use Boolean logic, such as including "and" or "or" operators or complex conditional statements. The policy can include multiple stages. The policy can indicate a number of copies of the packet to generate, and indicate one or more capture servers to which to send the packet copies.

In an example, the policy can include a rule that filters based on a type of HTTP header.

EXAMPLE 1

Policy: Only capture packets with HTTP HEAD requests:
Sample packets (showing only relevant information):
    Request packet 1: TCP SYN
    Response packet 2: TCP SYN ACK
    Request packet 3: TCP ACK
    Request packet 4: HTTP HEAD "www.xyz.com"
    Response packet 5: HTTP Content
    Request packet 6: HTTP HEAD "www.xyz.com/ad1"
    Response packet 7: HTTP Content
    Response packet 8: HTTP Content
    Request packet 9: RST In this example, only packets 4 and 6 satisfy the policy criteria and are copied to generate a mirror copy, the mirror copy being sent to the capture servers 114.

In an example, the policy can include a rule that filters based on fields in a DNS packet.

EXAMPLE 2

Policy: Only capture DNS packets with A records and matching name lookups with ".com.":
Sample abstracted packets:

| | |
|---|---|
| Request packet 1: UDP | www.xyz.com A |
| Response packet 2: UDP | 1.2.3.4 |
| Request packet 3: UDP | www.xyz.com AAAA |
| Response packet 4: UDP | ab00:fc00::6906 |
| Request packet 5: UDP | www.abc.com A |
| Response packet 6: UDP | 2.2.3.4 |
| Request packet 7: UDP | www.xyz.net A |
| Response packet 8: UDP | 1.2.3.5 |

In this example, only packets 1 and 5 satisfy the policy criteria and are copied to generate a mirror copy. The mirror copy is sent to the capture servers 114.

Figure 2:
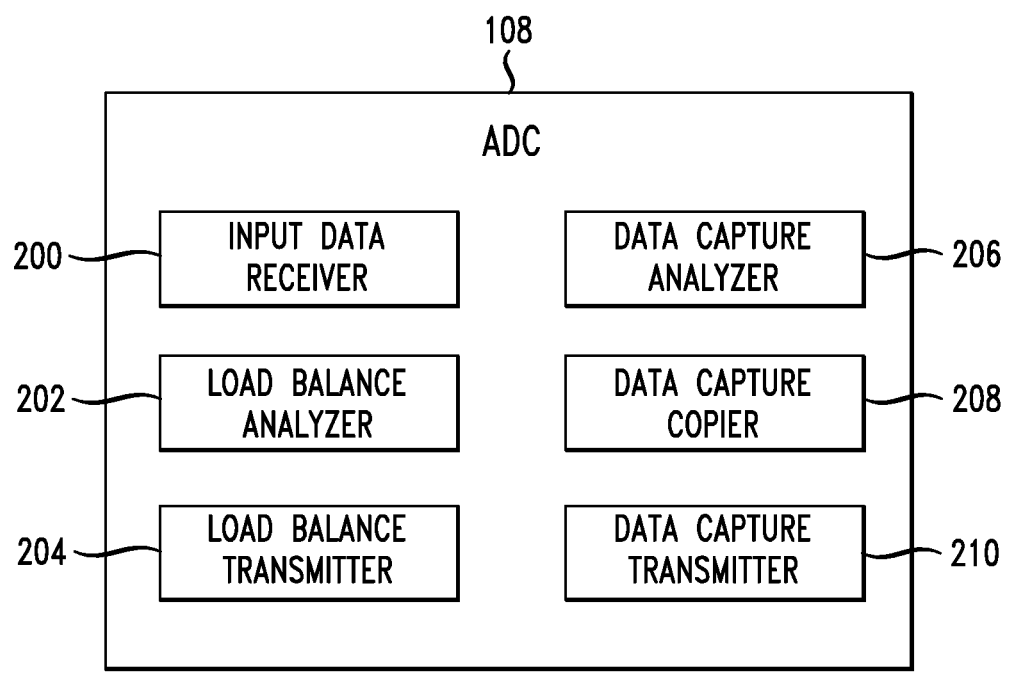
FIG. 2 shows an application delivery controller of the data capture system.

FIG. 2 shows the ADC 108 in greater detail. ADC 108 includes an input data receiver 200, a load balance analyzer 202, a load balance transmitter 204, a data capture analyzer 206, a data capture copier 208, and a data capture transmitter 210. The input data receiver 200 receives the packets transmitted to the ADC 108. The load balance analyzer 202 selects a destination real server 112 for each packet received by the ADC 108. The selection of the destination real server 112 is performed to balance the load of processing packets among the real servers 112, such as by distributing the load, taking into consideration factors, such as availability or resources of the real servers 112. The load balance transmitter 204 transmits each packet to the real server 112 that was selected as a destination for the packet.

The data capture analyzer 206 determines, such as by using one or more policies, which packets should be transmitted to the capture servers 114. The policy can include one or more filters and rules that establish criteria. Packets that satisfy the filter's criteria are sent to a capture server 114. The filtering process can include determining to which capture server 114 the packet should be sent. Different filters can be associated with different capture servers 114, such that a packet that satisfies the criteria of one filter is designated to be transmitted to one or more capture servers 114 that are associated with the filter associated. In one embodiment, a packet can be sent to two different capture servers 114 if it satisfies respective filter criteria associated with the two different capture servers 114. The data capture copier 208 generates a mirror copy 105 of a packet that satisfies criteria associated with a capture server 114. The data capture transmitter 210 transmits the mirror copy 105 to the capture server 114 associated with the filter. When more than one capture server 114 is associated with a filter, the data capture transmitter 210 can select a capture server 114 associated with the filter to receive the mirror copy 105, such as by performing load balancing.

In the example shown in FIG. 1, packet 101 does not satisfy filter criteria associated with any of the capture servers 114 and is transmitted to a selected real server 112, but not to a capture server 114. Packet 103 does satisfy criteria of a filter associated with at least one of the capture servers 114. The ADC 108 generates a mirror copy 105 of packet 103 and transmits the mirror copy 105 to the capture server 114 that is associated with the filter. Additionally, packet 103 is transmitted to a selected real server 112.

Figure 3:
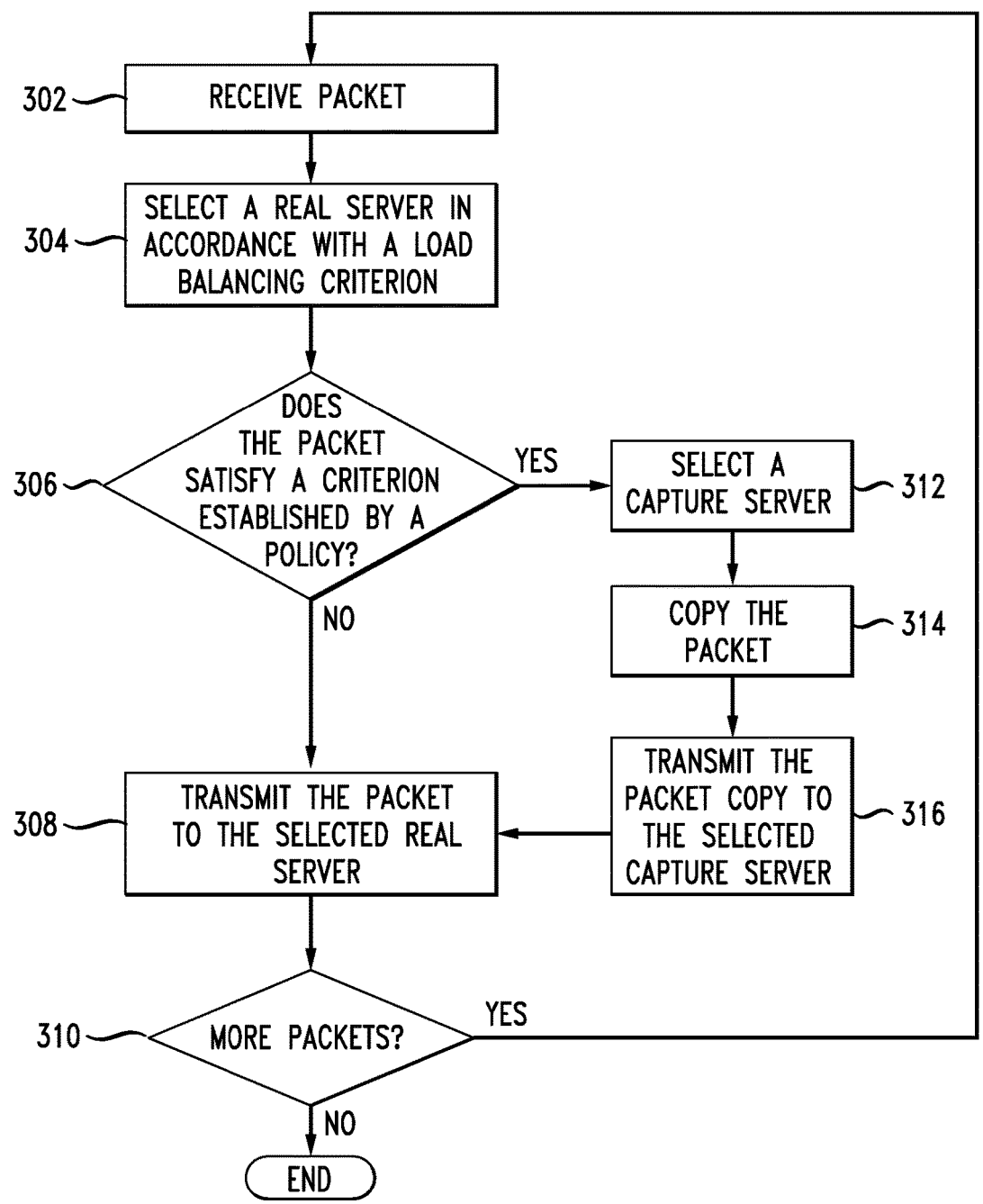
FIG. 3 shows a flowchart of a method to select data to be captured in accordance with the disclosure herein.

FIG. 3 shows a flowchart of an embodiment of the method in accordance with the disclosure herein. It is to be noted that the embodiment shown in FIG. 3 is only one example of the disclosed method and is not intended to limit the scope of the disclosure in any way.

The method begins at operation 302, in which a packet is received. At operation 304, a real server 112 is selected to process the packet, wherein the selection is performed using a load balancing criterion (the first criterion). The method continues at operation 306 to determine whether to retain the packet for data capture by determining whether the packet satisfies a second criterion of a policy associated with one of the capture servers 114. Both the first and second criteria are based on information in one of a session layer, a presentation layer, and an application layer associated with the first packet. If the determination is NO, the method continues at operation 308, in which the packet is transmitted to the selected real server 112. At operation 310, a determination is made whether there are more packets. If the determination is NO, the method ends. If the determination is YES, the method continues at operation 302.

If the determination is YES, the method continues at operation 312, in which a capture server 114 is selected. At operation 314, a mirror copy of the packet is generated. At operation 316, the mirror copy of the packet is transmitted to the selected capture server 114. The method continues at operation 308.

A combination of two or more operations of operations 304, 306, 308, 312, and 314 can be performed on a packet while the packet is accessed by a single access operation.

Figure 4:
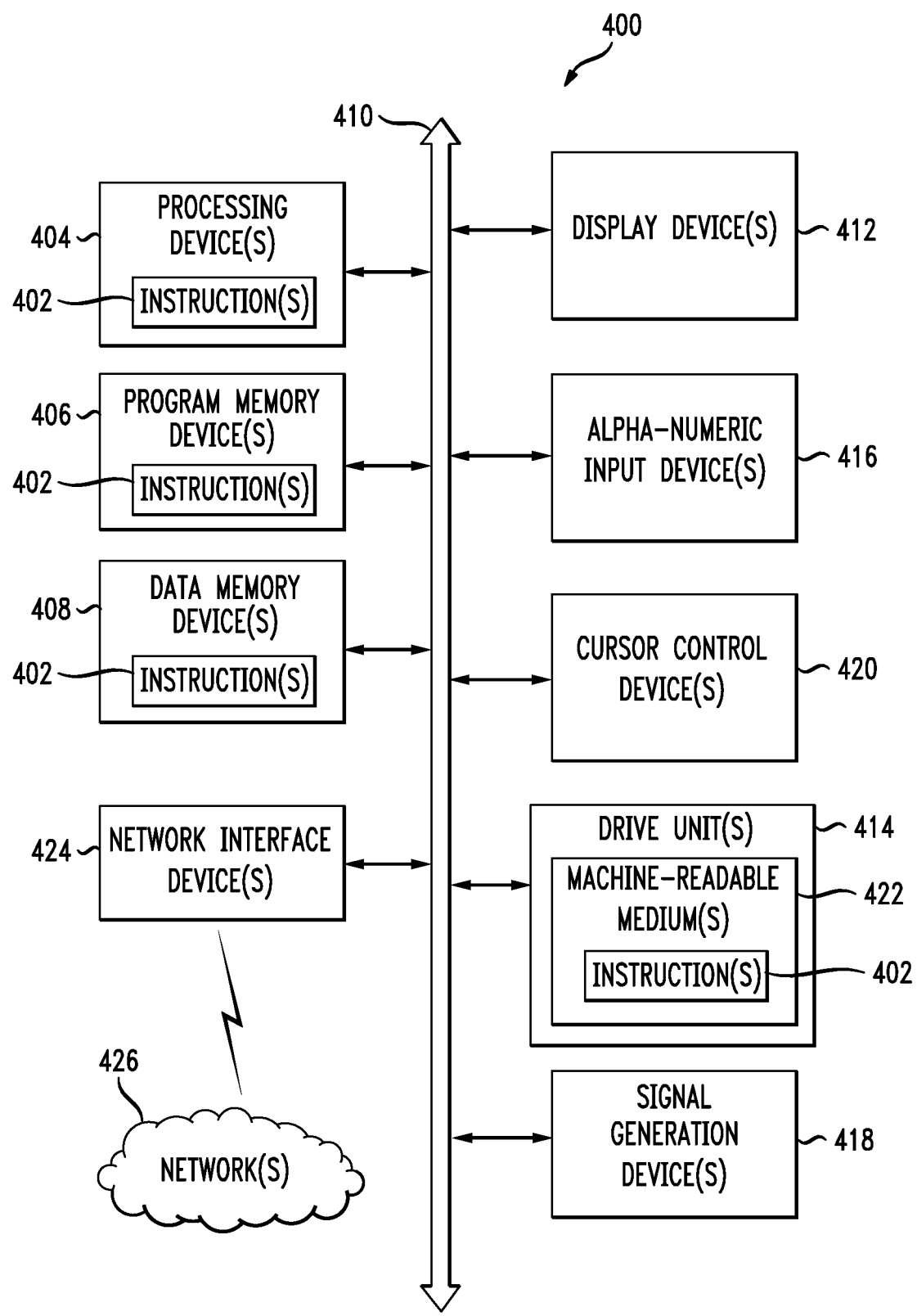
FIG. 4 is a block diagram showing at least a portion of an exemplary machine in the form of a computing system to perform methods according to one or more embodiments disclosed herein.

FIG. 4 is a block diagram of an embodiment of a machine in the form of a computing system 400, within which a set of instructions 402, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, or any machine capable of executing a set of instructions (sequential or otherwise) that specify actions to be taken by that machine.

The computing system 400 may include a processing device(s) 404 (e.g., a central processing unit (CPU), a graphics processing unit (GPU), or both), program memory device(s) 406, and data memory device(s) 408, which communicate with each other via a bus 410. The computing system 400 may further include display device(s) 412 (e.g., liquid crystals display (LCD), a flat panel, a solid state display, or a cathode ray tube (CRT)). The computing system 400 may include input device(s) 416 (e.g., a keyboard), cursor control device(s) 420 (e.g., a mouse), disk drive unit(s) 414, signal generation device(s) 418 (e.g., a speaker or remote control), and network interface device(s) 424.

The disk drive unit(s) 414 may include machine-readable medium(s) 422, on which is stored one or more sets of instructions 402 (e.g., software) embodying any one or more of the methodologies or functions disclosed herein, including those methods illustrated herein. The instructions 402 may also reside, completely or at least partially, within the program memory device(s) 406, the data memory device(s) 408, and/or within the processing device(s) 404 during execution thereof by the computing system 400. The program memory device(s) 406 and the processing device(s) 404 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

The present embodiment contemplates a machine-readable medium or computer-readable medium containing instructions 402, or that which receives and executes instructions 402 from a propagated signal so that a device connected to a network environment 426 can send or receive voice, video or data, and to communicate over the network 426 using the instructions 402. The instructions 402 may further be transmitted or received over a network 426 via the network interface device(s) 424. The machine-readable medium may also contain a data structure for storing data useful in providing a functional relationship between the data and a machine or computer in an illustrative embodiment of the disclosed systems and methods.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the disclosed subject matter may be referred to herein, individually and/or collectively, by the term "embodiment" merely for convenience and without intending to voluntarily limit the scope of this application to any single embodiment or concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. § 1.12(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, disclosed subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more programs running on a processing device. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing, can also be constructed to implement the methods, functions or logic described herein.

It should also be noted that software, which implements the disclosed methods, functions or logic, may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the disclosed subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments may be referred to herein, individually and/or collectively, by the term "embodiment" merely for convenience and without intending to voluntarily limit the scope of this application to any single embodiment or concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, disclosed subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. An application delivery controller comprising:
 a load balance analyzer, the load balance analyzer selecting, for each of a plurality of packets on a network, a server from a plurality of servers in the network in accordance with a first criterion, wherein the selected servers process each of the plurality of packets, and wherein the first criterion is based on first information associated with each of the plurality of packets, the first information associated with one of a session layer, presentation layer, and application layer; and
 a data capture analyzer, the data capture analyzer selecting at least one packet from the plurality of packets in accordance with a second criterion, the data capture analyzer transmitting the at least one selected packet to a capture server, wherein:
  the second criterion is set by a policy and based on second information associated with the at least one selected packet, the second information associated with one of the session layer, presentation layer, and application layer, the second information being different than the first information;

the second information is included in a selected one of
an application header and an application payload of
the at least one selected packet; and
the policy includes rules to access data in at least one
of the session layer, presentation layer, and application layer, wherein the rules use the second information and Boolean logic or the second information
and complex conditional statements to determine
which packets are transmitted to the capture server;
wherein the load balance analyzer selects the server for
one packet of the plurality of packets and the data
capture analyzer selects the one packet of the plurality
of packets while data included in the one packet of the
plurality of packets is accessed during a single access
operation.

2. The application delivery controller defined by claim 1, wherein:
the load balance analyzer selects a first server from the
plurality of servers in accordance with the first criterion
for processing a first packet and selects a second server
from the plurality of servers in accordance with the first
criterion for processing a second packet; and
the data capture analyzer transmits the at least one
selected packet to the capture server via a network
switch.

3. The application delivery controller defined by claim 2, wherein the first server processes the first packet in accordance with a first application, the first application associated with the first packet, the second server processing the second packet in accordance with a second application, the second application associated with the second packet.

4. The application delivery controller defined by claim 2, further comprising:
a data capture copier, the data capture copier generating a
copy of the at least one selected packet; and
a data capture transmitter, the data capture transmitter
transmitting the copy of the at least one selected packet
to the capture server.

5. The application delivery controller defined by claim 1, wherein:
the session layer, presentation layer, and application layer
are associated with one of an open systems interconnection model and a transfer control protocol/internet
protocol model;
more than one capture servers are associated with the
second criterion; and
the data capture analyzer transmits the at least one
selected packet to the capture server in response to
performing load balancing to select the capture server
from the more than one capture servers.

6. The application delivery controller defined by claim 2, wherein the load balance analyzer selects the second server and the data capture analyzer selects the second packet while the second packet is accessed by a single access operation.

7. The application delivery controller defined by claim 2, wherein the second information comprises a HEAD request and is included in an application header associated with the second packet.

8. The application delivery controller defined by claim 2, wherein the second information is included in an application payload associated with the second packet.

9. A method of capturing selected network data using a system comprising a load balance analyzer, a data capture analyzer and a capture server, wherein the network comprises a plurality of servers, the method comprising:
selecting, using the load balance analyzer, for each of a
plurality of packets on the network, a server from the
plurality of servers in accordance with a first criterion,
wherein the selected server processes each of the
plurality of packets, and wherein the first criterion is
based on first information associated with each of the
plurality of packets, the first information associated
with one of a session layer, presentation layer, and
application layer;
selecting, using the data capture analyzer, at least one
packet from the plurality of packets in accordance with
a second criterion, wherein:
the second criterion is set by a policy and based on
second information associated with the at least one
selected packet, the second information associated
with one of the session layer, presentation layer, and
application layer, the second information being different than the first information;
the second information is included in a selected one of
an application header and an application payload of
the at least one selected packet; and
the policy includes rules to access data in at least one
of the session layer, presentation layer, and application layer, wherein the rules use the second information and Boolean logic or the second information
and complex conditional statements to determine
which packets are transmitted to the capture server;
and
transmitting, using the data capture analyzer, the at
least one selected packet to the capture server;
wherein the load balance analyzer selects the server for
one packet of the plurality of packets and the data
capture analyzer selects the one packet of the plurality
of packets while data included in the one packet of the
plurality of packets is accessed during a single access
operation.

10. The method defined by claim 9, further comprising:
selecting a first server from the plurality of servers in
accordance with the first criterion;
processing a first packet by the first server;
selecting a second server from the plurality of servers in
accordance with the first criterion;
processing a second packet by the second server; and
transmitting, using the data capture analyzer, the at least
one selected packet to the capture server via a network
switch.

11. The method defined by claim 10, further comprising:
processing the first packet by the first server in accordance
with a first application, the first application associated
with the first packet; and
processing the second packet by the second server in
accordance with a second application, the second application associated with the second packet.

12. The method defined by claim 10, further comprising:
generating a copy of the second packet; and
transmitting the copy of the second packet to the capture
server.

13. The method defined by claim 9, wherein:
the session layer, presentation layer, and application layer
are associated with one of an open systems interconnection model and a transfer control protocol/internet
protocol model;
more than one capture servers are associated with the
second criterion; and
the data capture analyzer transmits the at least one
selected packet to the capture server in response to
performing load balancing to select the capture server
from the more than one capture servers.

14. The method defined by claim 10, further comprising accessing the second packet by a single access operation during which the second server is selected and the second packet is selected.

15. The method defined by claim 10, wherein the second information comprises a HEAD request and is included in one of an application header and an application payload associated with the second packet.

16. A non-transitory computer-readable storage medium storing instructions that, when executed by a device, cause the device to perform operations comprising:
selecting, for each of a plurality of packets on a network, a server from a plurality of servers in the network in accordance with a first criterion, wherein the selected server processes each of the plurality of packets, and wherein the first criterion is based on first information associated with each of the plurality of packets, the first information associated with one of a session layer, presentation layer, and application layer;
selecting at least one packet from the plurality of packets in accordance with a second criterion, wherein:
the second criterion is set by a policy and based on second information associated with the at least one selected packet, the second information associated with one of the session layer, presentation layer, and application layer, the second information being different than the first information;
the second information is included in a selected one of an application header and an application payload of the at least one selected packet; and
the policy includes rules to access data in at least one of the session layer, presentation layer, and application layer, wherein the rules use the second information and Boolean logic or the second information and complex conditional statements to determine which packets are transmitted to a capture server; and
transmitting the at least one selected packet to the capture server;
wherein the server for one packet of the plurality of packets and the one packet of the plurality of packets are selected while data included in the one packet of the plurality of packets is accessed during a single access operation.

17. The non-transitory computer-readable storage medium defined in claim 16, the operations further comprising:
selecting a first server from the plurality of servers in accordance with the first criterion;
processing a first packet by the first server;
selecting a second server from the plurality of servers in accordance with the first criterion;
processing a second packet by the second server; and
transmitting, using the data capture analyzer, the at least one selected packet to the capture server via a network switch.

18. The non-transitory computer-readable storage medium defined in claim 17, the operations further comprising:
processing the first packet by the first server in accordance with a first application, the first application associated with the first packet; and
processing the second packet by the second server in accordance with a second application, the second application associated with the second packet.

19. The non-transitory computer-readable storage medium defined in claim 17, the operations further comprising:
generating a copy of the second packet; and
transmitting the copy of the second packet to the capture server.

20. The non-transitory computer-readable storage medium defined in claim 17, wherein:
the second server and the second packet are selected while the second packet is accessed by a single access operation;
more than one capture servers are associated with the second criterion;
the data capture analyzer transmits the at least one selected packet to the capture server in response to performing load balancing to select the capture server from the more than one capture servers; and
the second information comprises a HEAD request and is included in an application header associated with the second packet.

* * * * *